UNITED STATES PATENT OFFICE.

MOSES M. BAUMGARTNER, OF FREEPORT, ILLINOIS.

WHOLE-RICE MEAL.

1,399,920.   Specification of Letters Patent.   Patented Dec. 13, 1921.

No Drawing.   Application filed April 19, 1920.   Serial No. 374,921.

*To all whom it may concern:*

Be it known that I, MOSES M. BAUMGARTNER, a citizen of the United States, residing at Freeport, in the county of Stephenson and State of Illinois, have invented certain new and useful Improvements in Whole-Rice Meal, of which the following is a specification.

This invention is an improvement on my Patent No. 1,239,555, patented September 11, 1917, and its object is to provide a whole rice meal containing all the natural food elements, which will keep during any and all kinds of weather, which is not adulterated, which constitutes a balanced food and requires only brief cooking to prepare it for ordinary table use.

As set forth in my earlier patent, the rough rice, without previous preparation, is soaked in water until the rice has absorbed substantially all the water possible, and is then cooked in live steam for from 15 to 60 minutes. The rice is then dried by heating until it has reached its original bulk or until the water has been eliminated, the drying process being continued at a sufficient temperature to parch the rice and impart thereto a desirable flavor. The hulls and foreign matter are then removed in hulling and separating machines or by other suitable means.

By the foregoing process all the natural food qualities of the rice are preserved and it is stabilized and sterilized so that it will not become rancid or wormy.

I have heretofore proposed to pack the rice for the market in its original form and bulk but I now propose to reduce the rice by grinding or granulating to the form of a meal which possesses all the desirable properties and qualities of the whole rice treated as described but in a form which was not contemplated in my earlier patent and which I have since found will keep satisfactorily and which has the further advantage of being more easily and quickly prepared for table use.

The meal is packed in suitable air-tight containers for the market and it may be used in the manner customary with well-known breakfast foods, requiring a preparatory cooking of two or three minutes only.

I claim:

A whole rice meal consisting of sterilized dried rice kernels embodying the whole natural rice, including the germ and cuticle with the starch dextrinized and the fats and proteids stabilized, and reduced to a finely divided form.

MOSES M. BAUMGARTNER.